(12) United States Patent
Chen et al.

(10) Patent No.: US 8,775,551 B2
(45) Date of Patent: Jul. 8, 2014

(54) TESTING A NETWORK SYSTEM

(75) Inventors: Li-Ju Chen, Taipei (TW); Rick Wu, Taipei (TW)

(73) Assignee: International Business Machines Corporation, Armonk, NY (US)

(*) Notice: Subject to any disclaimer, the term of this patent is extended or adjusted under 35 U.S.C. 154(b) by 295 days.

(21) Appl. No.: 12/501,095

(22) Filed: Jul. 10, 2009

(65) Prior Publication Data

US 2010/0030862 A1  Feb. 4, 2010

(30) Foreign Application Priority Data

Jul. 31, 2008  (TW) .............................. 97129090 A

(51) Int. Cl.
*G06F 15/16* (2006.01)
(52) U.S. Cl.
USPC .......................... 709/217; 709/203; 709/224
(58) Field of Classification Search
USPC ....................................................... 709/217
See application file for complete search history.

(56) References Cited

U.S. PATENT DOCUMENTS

| | | | |
|---|---|---|---|
| 6,499,052 B1 | 12/2002 | Hoang et al. | |
| 6,560,564 B2 * | 5/2003 | Scarlat et al. | 702/186 |
| 6,826,606 B2 * | 11/2004 | Freeman et al. | 709/223 |
| 6,961,759 B2 | 11/2005 | Brown et al. | |
| 7,203,720 B2 | 4/2007 | Smedberg et al. | |
| 7,290,056 B1 * | 10/2007 | McLaughlin, Jr. | 709/230 |
| 7,315,826 B1 * | 1/2008 | Guheen et al. | 705/7.29 |
| 7,334,001 B2 * | 2/2008 | Eichstaedt et al. | 1/1 |
| 7,363,374 B2 * | 4/2008 | Paul et al. | 709/226 |
| 7,380,163 B2 * | 5/2008 | Davies et al. | 714/5.11 |
| 7,380,170 B2 | 5/2008 | Sluiman et al. | |
| 7,437,604 B2 * | 10/2008 | Davies et al. | 714/5.11 |
| 7,444,256 B2 * | 10/2008 | Aliphas | 702/119 |
| 7,464,214 B2 * | 12/2008 | Davies et al. | 710/302 |
| 7,516,209 B2 * | 4/2009 | Raghuraman et al. | 709/224 |
| 7,610,378 B2 * | 10/2009 | Teodosiu et al. | 709/225 |
| 7,610,400 B2 * | 10/2009 | L'Heureux et al. | 709/237 |
| 7,657,927 B2 * | 2/2010 | Tajalli et al. | 726/2 |
| 7,725,530 B2 * | 5/2010 | Sah et al. | 709/203 |
| 7,805,407 B1 * | 9/2010 | Verbeke et al. | 707/634 |
| 7,844,692 B2 * | 11/2010 | Smedberg et al. | 709/223 |
| 7,921,225 B2 * | 4/2011 | Bonefas et al. | 709/238 |
| 7,949,779 B2 * | 5/2011 | Farber et al. | 709/234 |
| 7,953,903 B1 * | 5/2011 | Finkelstein et al. | 710/14 |

(Continued)

FOREIGN PATENT DOCUMENTS

| | | |
|---|---|---|
| EP | 1691509 A1 | 8/2006 |
| TW | I262002 | 9/2006 |

*Primary Examiner* — Melvin H Pollack
(74) *Attorney, Agent, or Firm* — A. Bruce Clay

(57) ABSTRACT

A network system uses a staging server. The network system comprises an existing server and a client device that transmits session traffic comprising an HTTP request message. The HTTP request message is duplicated to form duplicated HTTP request messages. It is determined whether the HTTP request message has a first session identifier. If so, a mapping relation between the first session identifier and a second session identifier is searched for. The duplicated HTTP request messages to the existing server and the staging server, respectively, are transmitted, wherein the session identifier of the HTTP request message to the staging server is replaced with the second session identifier based on the first session identifier and the mapping relation. One embodiment may also comprise receiving an HTTP reply message from the existing server and an HTTP reply message from the staging server. The HTTP reply message from the existing server and the HTTP reply message from the staging server are compared.

22 Claims, 8 Drawing Sheets

(56) References Cited

U.S. PATENT DOCUMENTS

| | | | |
|---|---|---|---|
| 7,970,898 B2* | 6/2011 | Clubb et al. | 709/224 |
| 8,024,451 B2* | 9/2011 | Fowler et al. | 709/224 |
| 8,055,724 B2* | 11/2011 | Amegadzie et al. | 709/217 |
| 2004/0003070 A1* | 1/2004 | Fernald et al. | 709/223 |
| 2004/0046787 A1* | 3/2004 | Henry et al. | 345/744 |
| 2005/0021708 A1* | 1/2005 | Raghuraman et al. | 709/223 |
| 2006/0080536 A1* | 4/2006 | Teppler | 713/176 |
| 2006/0212561 A1* | 9/2006 | Feng | 709/223 |
| 2007/0168704 A1 | 7/2007 | Connolly et al. | |
| 2007/0198688 A1 | 8/2007 | Smedberg et al. | |
| 2008/0201690 A1* | 8/2008 | Lovisa et al. | 717/107 |
| 2010/0153546 A1* | 6/2010 | Clubb et al. | 709/224 |
| 2010/0241748 A1* | 9/2010 | Ansari et al. | 709/225 |
| 2010/0268782 A1* | 10/2010 | Zombek et al. | 709/206 |
| 2011/0078461 A1* | 3/2011 | Hellhake et al. | 713/189 |
| 2011/0196943 A1* | 8/2011 | Bornstein et al. | 709/219 |

* cited by examiner

TESTING A NETWORK SYSTEM

BACKGROUND OF THE INVENTION

1. Field of the Invention

The present invention relates generally to a network technology, and more particularly, to a method, apparatus, and computer program product for testing a network system.

2. Description of the Related Art

Doing business over the Internet is more and more common. Internet transactions are mainly conducted through web browsers and web servers using the hyper-text-transfer protocol (HTTP).

The hyper-text-transfer protocol is the technical foundation of the World Wide Web (WWW). With this protocol, information is transferred and displayed from one computer to another. The files containing the information are usually written in the Hypertext Markup Language (HTML). The files also include identifiers, for example, Universal Resource Locators (URL). The HTML language includes commands executed by a program at the receiving computer. The program at the receiving computer is typically known as a browser. The browser can display information from another computer in an HTML file and can return user information to the program sending the HTML file. The computers sending HTML files and the files corresponding to URLs within the HTML files are typically known as servers.

In response to a browser request for a page, a server sends corresponding multiple HTML files. When the HTML files are received by the computer executing the browser, each communication stack layer performs its function. A datastream which contains an HTTP header and corresponding data segment is provided to the browser.

One of the data fields included in the HTTP header of an HTML file is a "cookie" data field. When receiving an HTML file with a cookie, the browser can store the cookie data. On the other hand, after the cookie data is sent to the browser computer, subsequent messages sent from the browser to the server can be returned to the server in the HTTP header.

Session connection technology is one of the foundations of the present invention. A unique session ID is generated when a new session is started. Within the same session, all embedded links in the response page can then be stamped with the same session ID. As long as the user stays in the links of the first page or pages generated from links in the first page, the session continues. However, when a session's age reaches the lifetime set by the server, the session expires.

With the rising popularity of the Internet, there is considerable demand for replacing the old server system with a new server system. Whether the new server system can be operated smoothly under the traffic model of the old server system is a concern. For example, an internet bank plans to replace their backend database from a first kind of database to a second kind of database, wherein the first kind of database and the second kind of database, respectively, belong to different vendors and technology categories. Thus, it is an important issue for the supplier of the second kind of database and the internet bank to evaluate and test the second kind of database to determine whether it can work well in the on-line production/existing system.

One approach to the above issue is a brute force approach, including running all possible test cases manually or using test automation tools. In this approach, the user in the production/existing server may sense an unusual situation when testing. Further, the test cases cannot cover all possible situations, and extra testing manpower is wasted.

Thus, when evaluating and testing the new server system to determine whether the new server system can work well with the on-line production/existing system, the following issues are important: the end user should not be able to detect any changes happening in the on-line production/existing system, a developer should not need to add any code snippets to the internet application program, and the testing method should be able to verify the traffic patterns in the real network.

SUMMARY OF THE INVENTION

In accordance with a first embodiment of the invention, a method is provided for testing a network system using a staging server, wherein the network system may comprise an existing server and a client device transmitting an HTTP request message of session traffic and the HTTP request message is duplicated to form duplicated HTTP request messages. The method may comprise detecting whether the HTTP request message has a first session identifier; in response to the HTTP request message having the first session identifier, searching for a mapping relation of the first session identifier and a second session identifier; and transmitting the duplicated HTTP request messages respectively to the existing server and the staging server, wherein the session identifier of the HTTP request message to the staging server is replaced to the second session identifier based on the first session identifier and the mapping relation.

Further to this embodiment, the method may further comprise receiving an HTTP reply message from the existing server and an HTTP reply message from the staging server; and comparing the HTTP reply message from the existing server and the HTTP reply message from the staging server.

Further to this embodiment, the method may further comprise detecting whether the staging server is overloaded; in response to the existing server being overloaded, only transmitting the HTTP request message to the existing server without duplicating the HTTP request message; and indicating a test result of "BYPASS," after the step of receiving the HTTP reply message.

Further to this embodiment, the method may further comprise detecting whether the HTTP request message has a test case ID; and in response to the HTTP request message having the test case ID, duplicating the HTTP request message to form the duplicated HTTP request messages. In response to the HTTP request message not having the test case ID, the method may further comprise detecting whether the HTTP request message is the first HTTP request message of the session traffic; and in response to the HTTP request message being the first HTTP request message of the session traffic, generating a test case ID of the first HTTP request message of the session traffic. In response to the HTTP request message not being the first HTTP request message of the session traffic, the method may further comprise transmitting the HTTP request message only to the existing server without duplicating the HTTP request message, indicate a test result of "BYPASS."

Further to this embodiment, in response to transmitting the duplicated HTTP request messages, respectively, to the existing server and the staging server, the method may further comprise detecting whether the HTTP reply message from the existing server and the HTTP reply message from the staging server, respectively, have a session identifier; and in response to the HTTP reply message from the existing server and the HTTP reply message from the staging server respectively having the session identifier, extracting the first session identifier and the second session identifier and indicating the mapping relation of the first session identifier and the second session identifier. In response to the HTTP reply message from the existing server not having the session identifier, the method may further comprise sending the duplicated HTTP request messages, respectively, to the existing server and the staging server; receiving the HTTP reply message from the existing server with the first session identifier and the HTTP reply message from staging server with the second session identifier; and generating the mapping relation based on the first session identifier and the second session identifier.

Further to this embodiment, in response to receiving the HTTP reply message from the existing server and the HTTP reply message from the staging server, the method may further comprise detecting whether a verification point is required, wherein in response to the verification point being not required, indicating a test result of "NON-VP;" detecting whether an error occurs in the HTTP reply messages, wherein in response to an error occurring, indicating a test result of "FAILED;" detecting whether the HTTP reply messages respectively having the session identifiers, wherein in response to the HTTP reply messages not having the session identifiers, transmitting the HTTP reply message from the existing server to the client device; and in response to the verification point being required and the error not occurring in the HTTP reply messages, abstracting the HTTP reply messages and indicating a test result of "SUCCESS."

In accordance with a second embodiment of the invention, a computer program product is provided for testing a network system using a staging server, wherein the network system comprises an existing server and a client device transmitting an HTTP request message of session traffic and the HTTP request message is duplicated to form duplicated HTTP request messages. The computer program product may comprise program code for causing a computer system to detect whether the HTTP request message has a first session identifier; in response to the HTTP request message having the first session identifier, searching for a mapping relation of the first session identifier and a second session identifier; and transmitting the duplicated HTTP request message, respectively, to the existing server and the staging server, wherein the session identifier of the HTTP request message to the staging server is replaced by the second session identifier based on the first session identifier and the mapping relation.

In accordance with a third embodiment of the invention, a computer is provided for testing a network system using a staging server, wherein the network system comprises an existing server and a client device transmitting a HTTP request message of session traffic and the HTTP request message is duplicated to form duplicated HTTP request messages. The computer may comprise a memory storing computer program instructions; and a processor for executing the computer program instructions and for controlling the operation of the computer in accordance with the functions defined by the computer program instructions. The computer program instructions may define detecting whether the HTTP request message has a first session identifier; in response to the HTTP request message having the first session identifier, searching for a mapping relation of the first session identifier and a second session identifier; and transmitting the duplicated HTTP request messages, respectively, to the existing server and the staging server, wherein the session identifier of the HTTP request message to the staging server is replaced by the second session identifier based on the first session identifier and the mapping relation.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings, in which:

Figure 1:
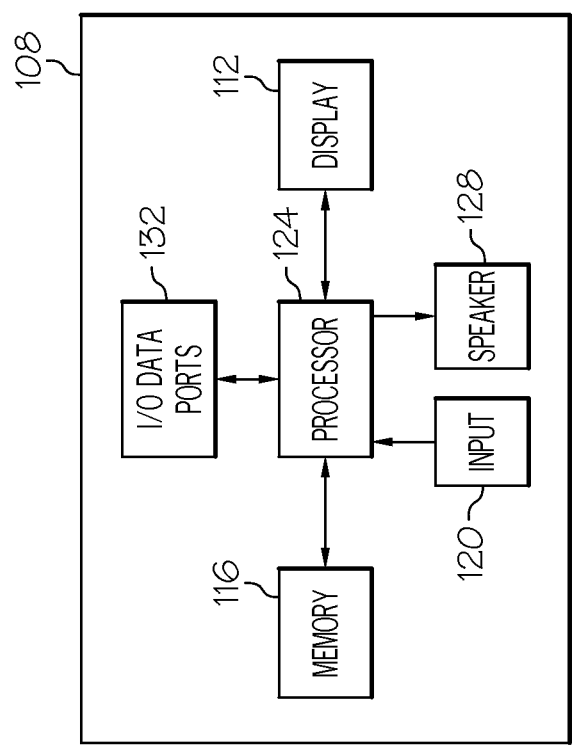
FIG. 1 is a block diagram of a data processing system according to an embodiment of the present invention.

The detailed description explains the preferred embodiments of the invention, together with advantages and features, by way of example with reference to the drawings.

DETAILED DESCRIPTION

The present invention will now be described more fully with illustrative embodiments of the invention. This invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Embodiments of the present invention provide for a technology of testing a network system using a staging server. The end users do not detect any changes happening in the on-line production/existing system. By investigating the behavior of the staging server, error cases or exceptional cases can be detected, and the purpose of evaluation and testing can be achieved.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable media may be utilized. The computer-usable or computer-readable media may be, for example but not limited to, an electronic, magnetic, optical, electromagnetic, infrared, or semiconductor system, apparatus, or device. More specific examples (a non-exhaustive list) of the computer-readable media would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable media could be paper or other suitable media upon which the program is printed, as the program can be electronically captured, via, for instance, optical scanning of the paper or other media, then compiled, interpreted, or otherwise processed in a suitable manner, if necessary, and then stored in a computer memory. In the context of this document, a computer-usable or computer-readable media may be any media that can contain, store, communicate, or transport the program for use by or in connection with the instruction execution system, apparatus, or device. The computer usable program code may be transmitted using any appropriate media, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Various embodiments of the present invention will now be described with reference to the figures. FIG. 1 illustrates an exemplary embodiment of a data processing system 108 suitable for a server, a client device, and a proxy device and network traffic associated therewith in accordance with embodiments of the present invention. The data processing system 108 typically comprises input device(s) 120 such as a keyboard or keypad; a display 112; and a memory 116 that communicate with a processor 124. The data processing system 108 may further comprise a speaker 128; and an I/O data port(s) 132 that also communicate with the processor 124. The I/O data ports 132 can be used to transfer information between the data processing system 108 and another computer system or a network. These components may be conventional components, such as those used in many conventional data processing systems, which may be configured to operate as described herein.

Figure 2:
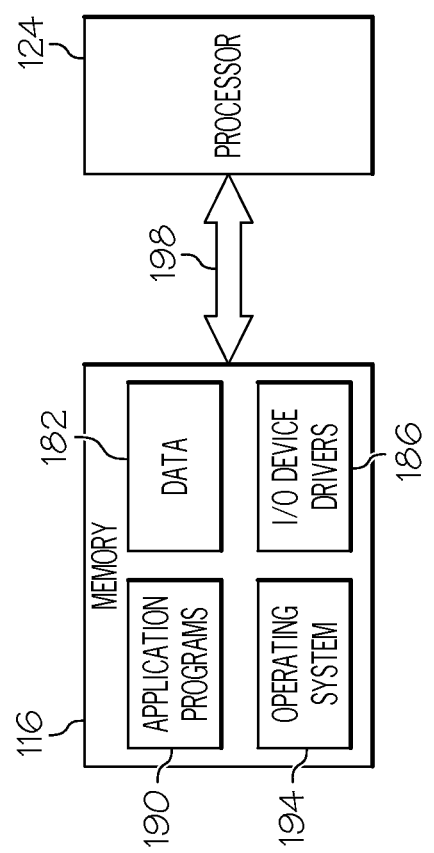
FIG. 2 is a block diagram of a memory and a processor according to an embodiment of the present invention.

FIG. 2 is a block diagram of data processing systems that illustrate systems, methods, and computer program products in accordance with embodiments of the present invention. The processor 124 communicates with the memory 116 via an address/data bus 198. The processor 124 can be any commercially available or custom microprocessor. The memory 116 is representative of the overall hierarchy of memory devices containing the software and data used to implement the functionality of the data processing system 108 of FIG. 1. The memory 116 can include, but is not limited to, the following types of devices: cache, ROM, PROM, EPROM, EEPROM, flash memory, SRAM, and DRAM.

As shown in FIG. 2, the memory 116 may comprise several categories of software and data used in the data processing system 108, such as operating system 194, application programs 190, input/output (I/O) device drivers 186, and data 182. As will be appreciated by those of skill in the art, the operating system 194 may be any operating system suitable for use with a data processing system, such as OS/2, AIX or System390 from International Business Machines Corporation, Armonk, N.Y., Win-dows95, Windows98, Win-dows2000, WindowsXP, or Windows Vista from Microsoft Corporation, Redmond, Wash., Unix or Linux. The I/O device drivers 186 typically include software routines accessed through the operating system 194 by the application programs 190 to communicate with devices such as the I/O data port(s) 132 and certain memory 116 components. The application programs 190 are illustrative of the programs that implement the various features of the data processing system 108 and preferably comprise at least one application which supports operations according to embodiments of the present invention. Finally, data 182 represents the static and dynamic data used by the application programs 190, the operating system 194, the I/O device drivers 186, and other software programs that may reside in the memory 116.

It is to be noted that the present invention should not be construed as limited to the configuration of FIG. 2 but is intended to encompass any configuration capable of carrying out the operations described herein.

Figure 3:
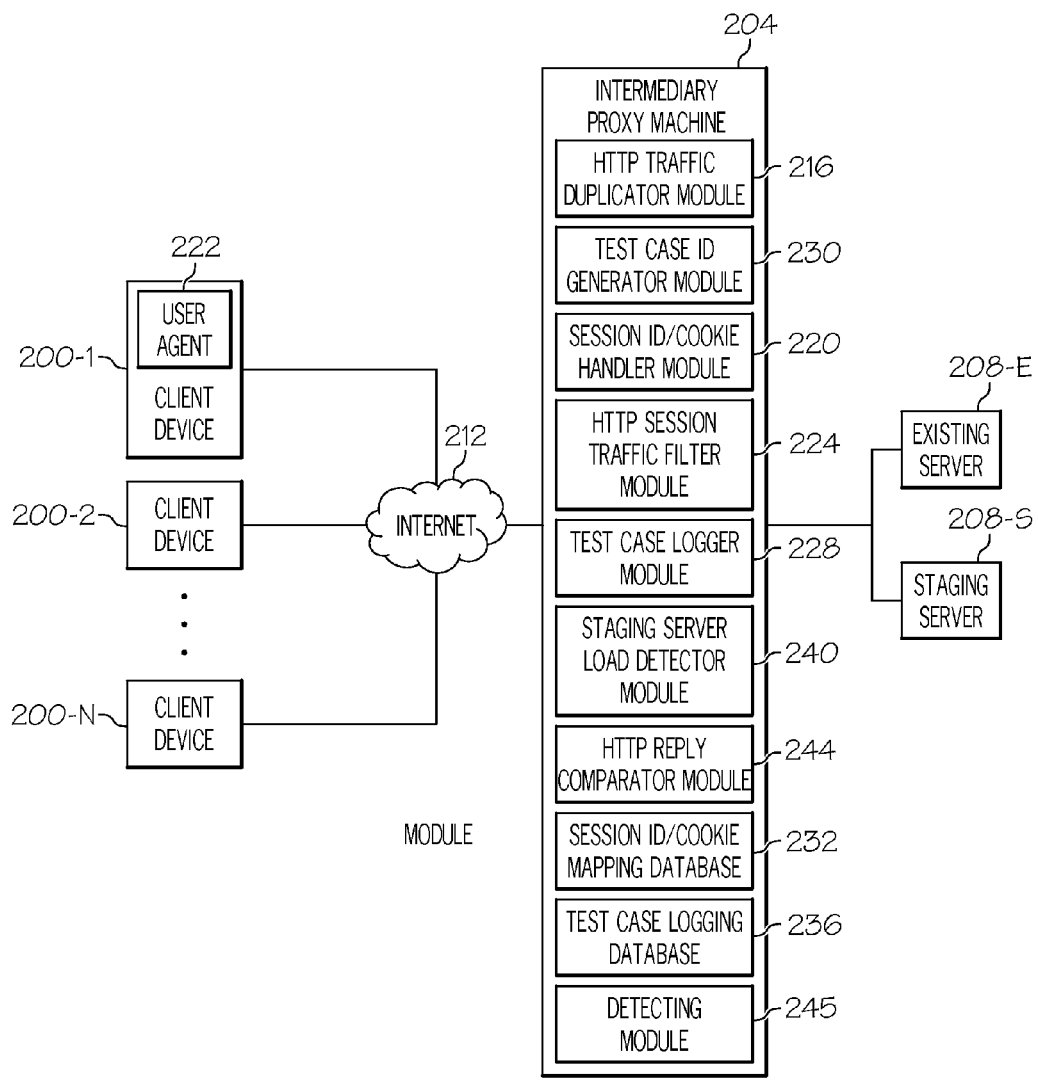
FIG. 3 depicts a block diagram of an Internet connection using an intermediary proxy machine according to an embodiment of the present invention.

With reference now to FIG. 3, there is depicted a block diagram of an Internet connection comprising an intermediary proxy machine 204 which may be utilized to implement the present invention. As depicted in FIG. 3, client devices 200-1, 200-2, . . . , 200-N, the intermediary proxy machine 204, an existing server 208-E, a staging server 208-S, and internet 212 are shown. The client device 200-1, for example, comprises a user agent 222. The user agent 222, such as a browser, is used to access data in web pages. The client devices 200-1, 200-2, . . . , 200-N connect to internet 212. Client device 200-1, 200-2, . . . , 200-N may be any type of network connectable device, such as a desktop computer, a laptop computer, a set top box, a PDA (Personal Digital Assistant), a public computer kiosk, an ATM (Automated Teller Machine), or a cellular telephone. The internet 212 is to be understood to be a world-wide -network of interconnected computers affording access between the existing server 208-E and the client device 200-1, 200-2, . . . , 200-N. The existing server 208-E is a computer or device on a network that manages and delivers web content, typically in Hyper-Text Markup Language (HTML) format. Further, it is understood that the function of the internet 212 can also be accomplished by any network of any interconnected computers.

As shown in FIG. 3, the intermediary proxy machine 204, such as a proxy server, is arranged between the existing server 208-E and the client devices 200-1, 200-2, . . . , 200-N. The intermediary proxy machine 204 can intercept HTTP request messages, transmit HTTP request messages to the existing server 208-E, receive HTTP reply messages, and transmit the HTTP reply message to the client device 200-1, 200-2, . . . , 200-N. In the embodiment, the intermediary proxy machine 204 is coupled between the existing server 208-E, the staging server 208-S, and the internet 212. In the embodiment, the intermediary proxy machine 204 comprises an HTTP traffic duplicator module 216, a session ID/cookie handler module 220, an HTTP session traffic filter module 224, a test case logger module 228, an HTTP reply comparator module 244, a staging server load detector module 240, a test case ID generator module 230, a session ID/cookie mapping database 232, a test case logging database 236, a transmitting module (not shown), and a detecting module 245. The HTTP traffic duplicator module 216, the session ID/cookie handler module 220, the HTTP session traffic filter module 224, the test case logger module 228, the test case ID generator module 230, the staging server load detector module 240, the HTTP reply comparator module 244, and the detecting module 245 can be implemented by plug-ins on the intermediary proxy machine 204. The functions and operations of these components will be explained subsequently in greater detail.

Figure 4:
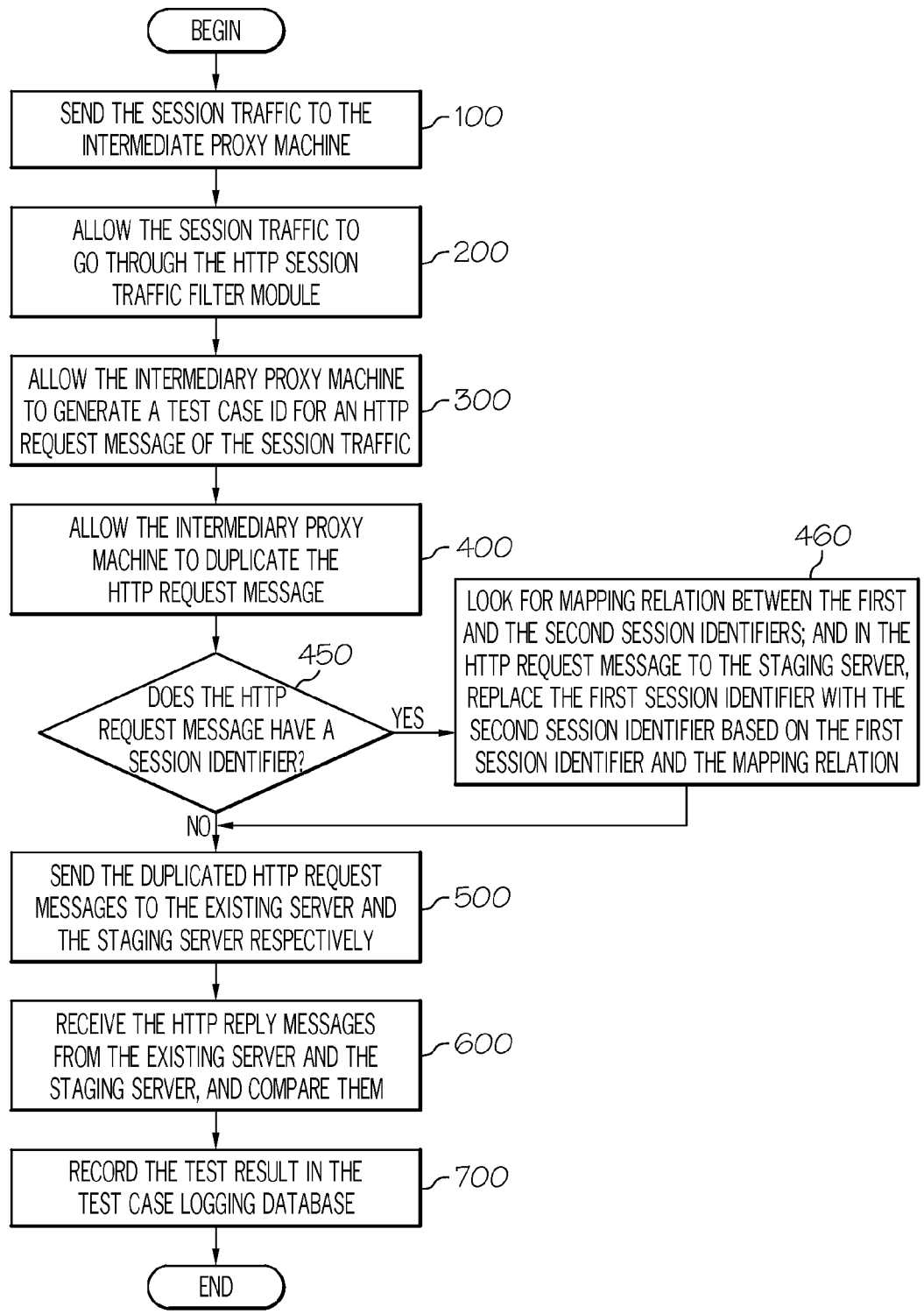
FIG. 4 shows a flow chart of a method of testing a network system using a staging server in accordance with an embodiment of the present invention.

FIG. 4 shows a flow chart of a method for testing a network system using a staging server 208-S in accordance with embodiments of the present invention. The network system can also comprise an existing server 208-E, a client device 200-1, an intermediary proxy machine 204, and an internet 212, as described in FIG. 3.

First, session traffic (action/message/URL) is sent to the intermediary proxy machine 204 (Step 100). As mentioned previously, the intermediary proxy machine 204 is placed in front of the existing server 208-E, so that all the session traffic would be sent to the intermediary proxy machine 204.

The session traffic goes through the HTTP session traffic filter module 224 (Step 200). When using the staging server 208-S to do the testing work, it is possible that an overload situation may occur in the staging server 208-S. For example, the grade of the staging server 208-S may be lower than the existing server 208-E. When heavy session traffic occurs, the staging server 208-S with a lower grade may be overloaded. Thus, the HTTP session traffic filter module 224 may filter the session traffic. Please note that Step 200 has a sub-step to detect whether the staging server 208-S is overloaded. If the staging server 208-S is not overloaded, the filtering step is not executed and the process goes to Step 300. The details of the above operation will be explained and described subsequently in reference to FIG. 5.

The intermediary proxy machine 204 generates a Test case ID for an HTTP request message of the session traffic (Step 300). More specifically, the test case ID generator module 230 of the intermediary proxy machine 204 generates the test case ID of the HTTP request message, and the HTTP request message will be sent to the HTTP traffic duplicator module 216. The details of the above operation will be explained and described with FIG. 6.

The intermediary proxy machine 204 duplicates the HTTP request message (Step 400). After the HTTP request messages are sent to the HTTP traffic duplicator module 216, the HTTP traffic duplicator module 216, which can be a plug-in, executes the duplicating step.

The detecting module 245 of the intermediate proxy machine 204 detects whether the HTTP request message has a session identifier, or not (Step 450). The detecting module 245 can be implemented by plug-ins to receive and detect the signals resulting from Step 400. The session identifier (for example, a session ID or cookie) can be used to determine the state information during HTTP transmission. If the HTTP request message does not contain a cookie, the HTTP request message is regarded as a first HTTP request message of a session traffic, and in later steps, a mapping relation is defined between a first session identifier (cookie1) from the existing server 208-E and a second session identifier (cookie2) from the staging server 208-S and is recorded in the session ID/cookie mapping database 232. Otherwise, if the HTTP request message contains a cookie, the HTTP request message is not regarded as the first HTTP request message of the session traffic. In other words, the mapping relation between the first session identifier (cookie1) and the second session identifier (cookie2) has been recorded in the session ID/cookie mapping database 232.

If the response to Step 450 is yes, at Step 460 the session ID/cookie handler module 220 will look for the mapping relation between the first session identifier (cookie1) and the second session identifier (cookie2) in the session ID/cookie mapping database 232; and in the HTTP request message to the staging server, the session ID/cookie handler module 220 will replace the first session identifier (cookie1) with the second session identifier (cookie2) based on the first session identifier (cookie1) and the above mapping relation.

Alternatively, taking the session ID for example, the session ID is stored in the URL query string, and a web application program can do URL rewriting thereon. Please refer to Table 1 where examples of the mapping relation between session ID 1 and session ID 2 and the mapping relation between cookie1 and cookie2 are shown.

TABLE 1

| Test case id | Production Machine session ID/cookie | Staging Machine session ID/cookie |
| --- | --- | --- |
| 20080710234112345767EFAC123 | JSessionID=EAB1234565 (session ID stored in the URL query string) | JSessionID=123ABC0012 (session ID stored in the URL query string) |
| 20080710234112345767EFAC127 | Cookies are stored in the HTTP header, HTTP_COOKIES | Cookies are stored in the HTTP header, HTTP_COOKIES |

TABLE 1-continued

| Test case id | Production Machine session ID/cookie | Staging Machine session ID/cookie |
| --- | --- | --- |
| | JSessionID="EAB1234565"; expires=Mon, 14-Jul-2008 19:30:42 GMT; Max-Age=2592000; Path=/banking/withdraw; Version="1"; Logon="Yes"; expires=Mon, 14-Jul-2008 19:30:42 GMT; Max-Age=2592000; Path=/banking/withdraw; Version="1" | JSessionID="123ABC0012"; expires=Mon, 14-Jul-2008 19:30:42 GMT; Max-Age=2592000; Path=/banking/withdraw; Version="1"; Logon="Yes"; expires=Mon, 14-Jul-2008 19:30:42 GMT; Max-Age=2592000; Path=/banking/withdraw; Version="1" |

At Step 500, the transmitting module of the intermediate proxy machine 204 sends the duplicated HTTP request messages to the existing server 208-E and the staging server 208-S, respectively.

The intermediary proxy machine 204 receives the HTTP reply messages from the existing server 208-E and the staging server 208-S, respectively, and compares the HTTP reply messages at Step 600. The details of the above operation will be explained and described in relation to FIG. 7.

The test case logger module 228 records the test result in the test case logging database 236 (Step 700). The details of the above operation will also be explained and described in relation to FIG. 7.

Figure 5:
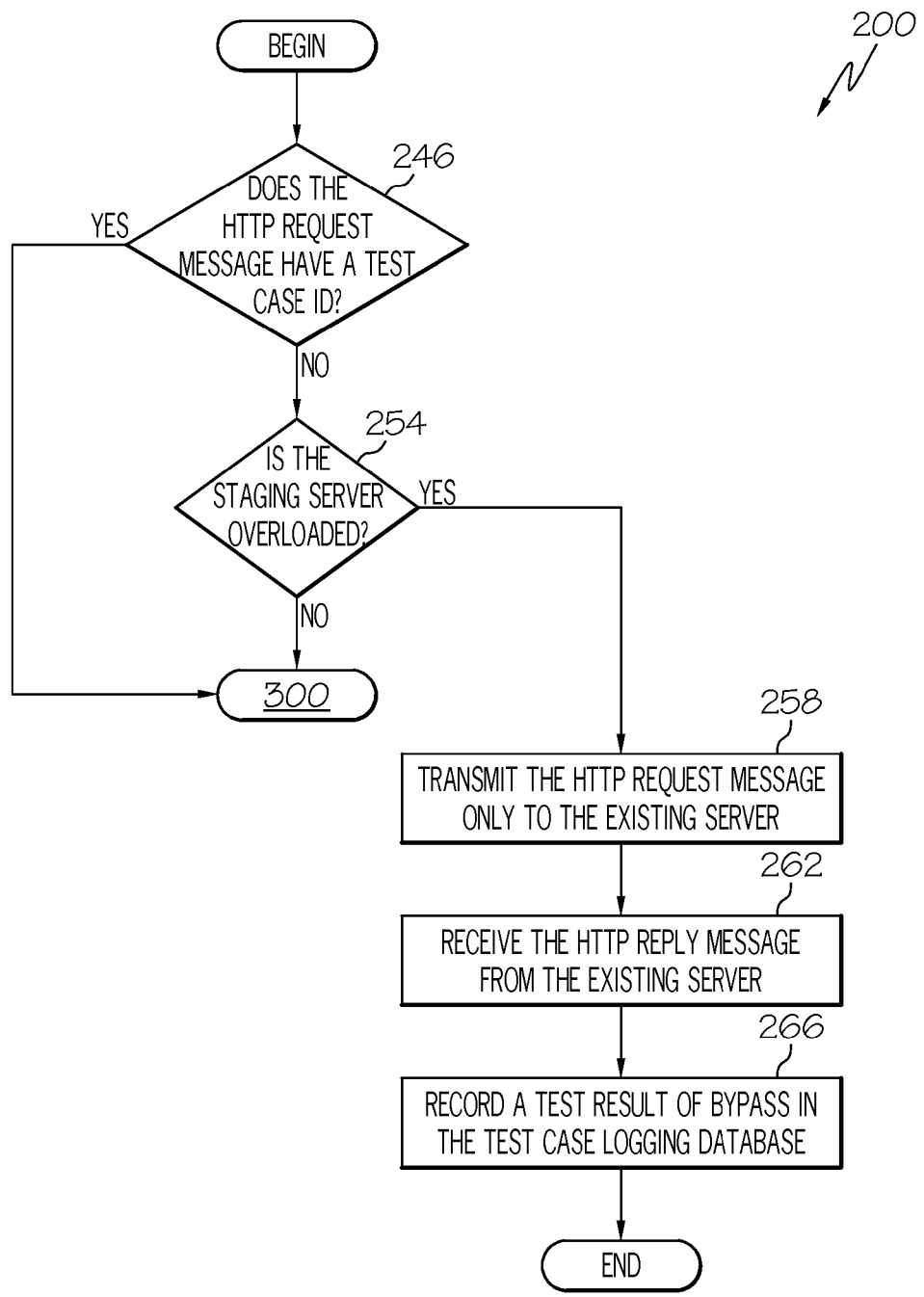
FIG. 5 shows a flow chart of filtering the session traffic by the HTTP session traffic filter module in accordance with an embodiment of the present invention.

FIG. 5 shows the steps of filtering the session traffic by the HTTP session traffic filter module 224 in accordance with embodiments of the present invention. First, the detecting module of the intermediary proxy machine 204 will determine whether, or not, the HTTP request message has a test case ID (Step 246). If the test case ID exists, go to Step 300. If the test case ID does not exist, the staging server load detector module 240 detects whether the staging server 208-S is overloaded (Step 254). If the staging server 208-S is not overloaded, then go to Step 300, see FIG. 6. If the staging server 208-S is overloaded, the HTTP request message is not duplicated and is only transmitted to the existing server 208-E (Step 258), then the intermediary proxy machine 204 receives the HTTP reply message from the existing server 208-E (Step 262), and then a test result of "BYPASS" is recorded in the test case logging database 236 (Step 266). In accordance with the above embodiment, when there is a test case ID in the HTTP request message or there is no overload situation in the staging server 208-S, the method goes to Step 300 in FIG. 6.

Figure 6:
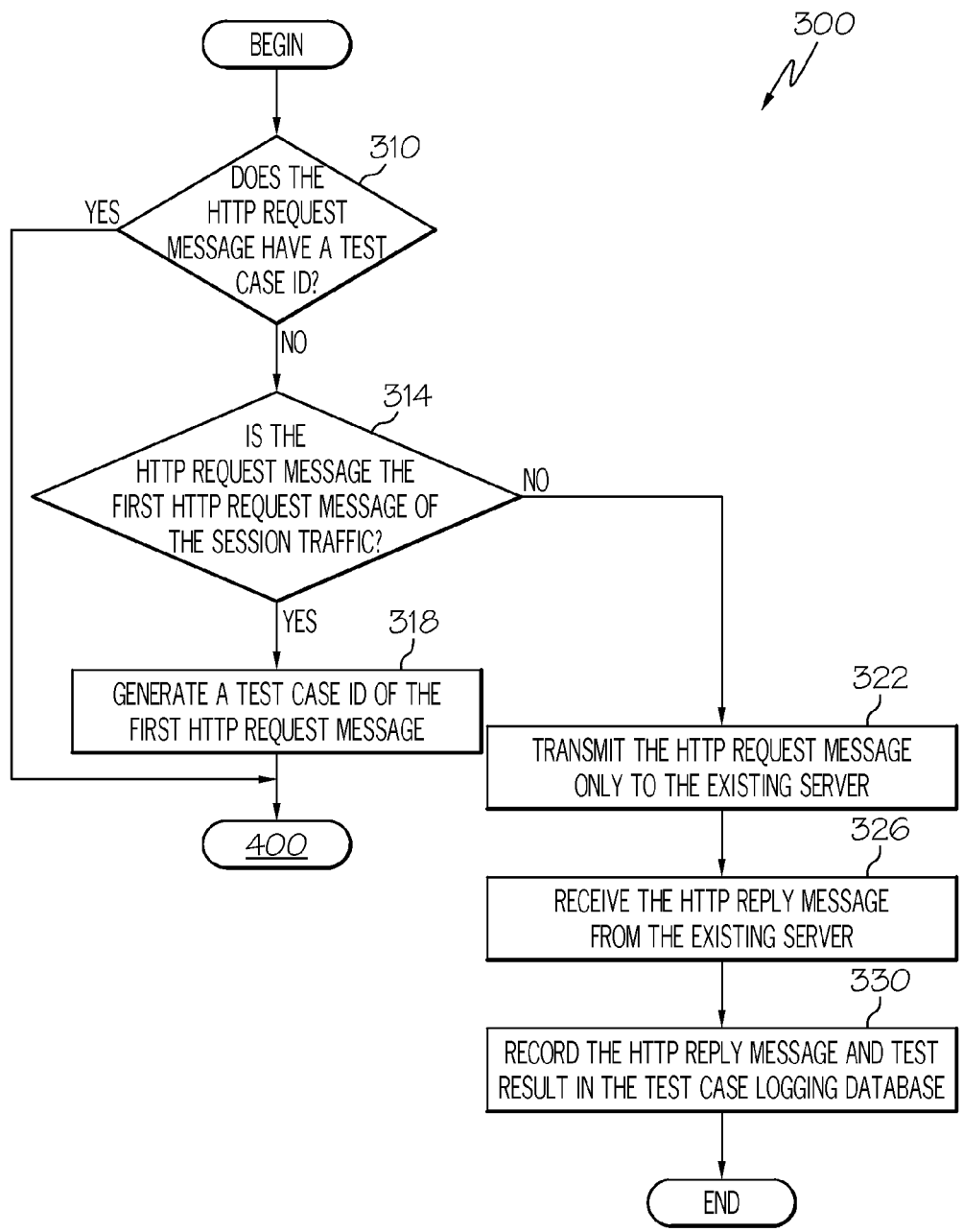
FIG. 6 shows a flow chart for generating a test case ID of a HTTP request message of the session traffic in accordance with an embodiment of the present invention.

FIG. 6 shows the steps of generating a test case ID of an HTTP request message of session traffic in accordance with an embodiment of the present invention. First, the detecting module of the intermediary proxy machine 204 detects whether the HTTP request message has a test case ID (Step 310). If there is a test case ID, go to Step 400, as previously described above with regard to FIG. 4. If there is no test case ID, the detecting module of the intermediary proxy machine 204 detects whether the HTTP request message is the first HTTP request message of the session traffic (Step 314). If the HTTP request message is the first HTTP request message of the session traffic, the test case ID generator module 230 of the intermediary proxy machine 204 generates a test case ID of the first HTTP request message (Step 318) and then goes to Step 400, FIG. 4. On the other hand, if the HTTP request message is not the first HTTP request message of the session traffic, the HTTP request message will not be duplicated and will only be transmitted to the existing server 208-E (Step 322). The intermediary proxy machine 204 receives the HTTP reply message from the existing server 208-E (Step 326), then the HTTP reply message and the test result of "bypass" are recorded in the test case logging database 236 (Step 330). In accordance with the above embodiment, if the HTTP request message is not the first HTTP request message of the session traffic, there is no test case ID generated. That is, the test case ID generator module 230 of the intermediary proxy machine 204 only generates a test case ID on the first HTTP request message of the session traffic.

Figure 7:
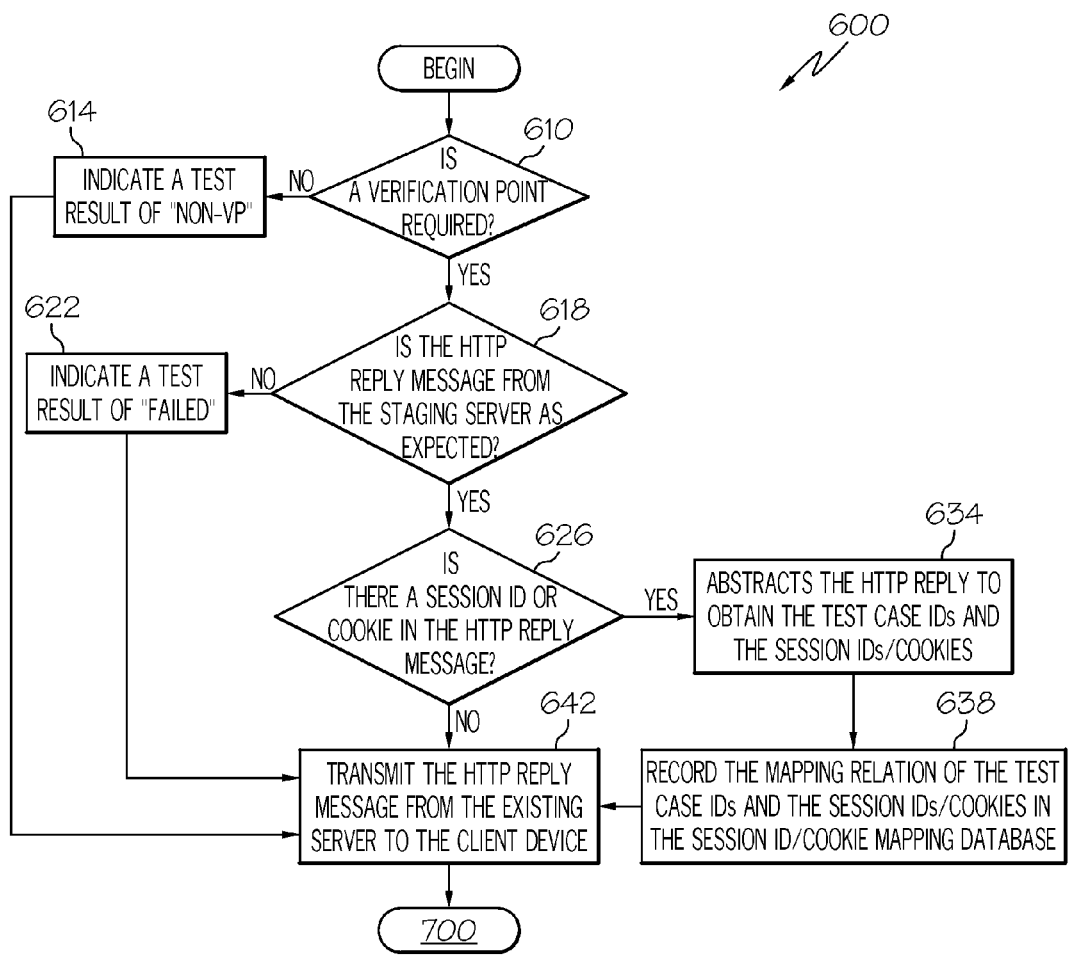
FIG. 7 shows a flow chart for processing and comparing the HTTP reply messages from the existing server and the staging server in accordance with an embodiment of the present invention.

FIG. 7 shows the steps of processing and comparing the HTTP reply messages from the existing server 208-E and the staging server 208-S in accordance with embodiments of the present invention. After the HTTP reply messages from the existing server 208-E and the staging server 208-S are received, the HTTP reply comparator module 244 of the intermediary proxy machine 204 executes a comparison operation on them. The comparison operation can be executed in various ways, for example, comparison on specific strings on the web pages to verify the record numbers of the existing server 208-E and the staging server 208-S. In FIG. 7, the detecting module of the intermediary proxy machine 204 detects whether a verification point is required (Step 610). If the verification point is not required, a test result of "NON-VP" (verification point not required) is indicated in the HTTP reply message (Step 614), and then the HTTP reply message for the existing server 208-E is transmitted to the client device 200-1 (Step 642). If the verification point is required, compare the HTTP reply messages from the existing server 208-E and the staging server 208-S, by the HTTP reply comparator 244, to determine whether the HTTP reply message from the staging server is as expected (Step 618). If the comparison result is not as expected, a test result of "FAILED" is marked in the HTTP reply message (Step 622), and then the HTTP reply message for the existing server 208-E is transmitted to the client device 200-1 (Step 642). If the comparison result is as expected, it is determined whether there is a session ID or cookie in the HTTP reply message (Step 626). If there is a session ID or cookie in the HTTP reply message, the session ID/cookie handler module 220 abstracts the HTTP reply to obtain the test case IDs and the session IDs/cookies (Step 634). The mapping relation of the test case IDs and the session IDs/cookies are recorded in the session ID/cookie mapping database (Step 638) for future use, and then the HTTP reply message for the existing server 208-E is transmitted to the client device 200-1 (Step 642).

Figure 8:
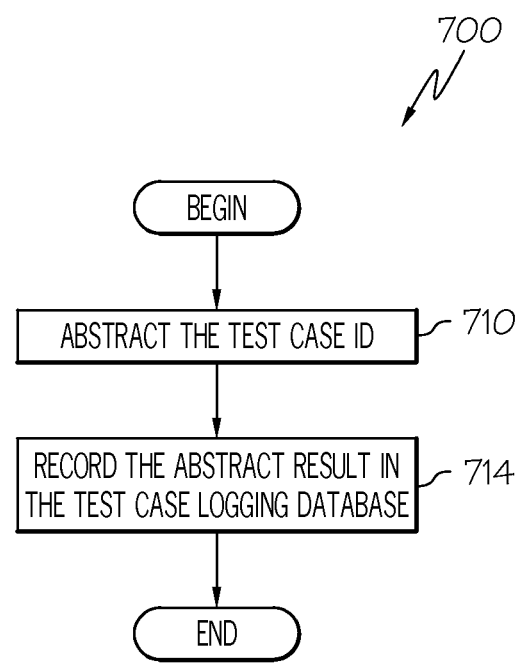
FIG. 8 shows a flow chart for recording the test result in the test case logger module in accordance with an embodiment of the present invention.

FIG. 8 shows the steps of recording the test result in the test case logger module 228 in accordance with embodiments of the present invention. The test case logger module 228 abstracts the test case ID (Step 710), wherein the abstracted result comprises URLs and actions/messages. The abstracted result is then recorded in the test case logging database 236 (Step 714). One example of the recorded result is shown in Table 2.

The HTTP reply comparator module 244 is used to compare the HTTP reply messages from the existing server 208-E and the staging server 208-S and to determine whether they are identical, such as in contents or record numbers, therein.

TABLE 2

| Test case id | URL | Action/message(HTTP headers dumps) | Result |
|---|---|---|---|
| 20080710234112345767EFAC123 | http://www.ibm.com/test1.jsp?v1=test1 | HTTP headers dump: Status 200 OK; User_Agent Netscape Navigator/V2.02; Headers PreferLanguage en_US . . . . . . | Success |
| 20080710234112345767EFAC123 . . . . . . | http://www.ibm.com/NonVPTest.jsp?v1=test | HTTP headers dump: Status 200 OK; User_Agent Netscape Navigator/V2.02; Headers PreferLanguage en_US . . . . . . | NonVP |
| 20080710234112345767EFAC123 | http://www.ibm.com/test2.jsp?v1=test1 | HTTP headers dump: Status 200 OK; User_Agent Netscape Navigator/V2.02; Headers PreferLanguage en_US . . . . . . | Fail |
| N/A | http://www.ibm.com/BypassTest.jsp?v1=test1 | HTTP headers dump: Status 200 OK; User_Agent Netscape Navigator/V2.02; Headers PreferLanguage en_US . . . . . . | Bypass |

With reference to FIGS. 3 to 8, as mentioned previously, the HTTP traffic duplicator module 216, the session ID/cookie handler module 220, the HTTP session traffic filter module 224, and the test case logger module 228 are plug-ins. When the staging server 208-S is not overloaded, the HTTP traffic duplicator module 216 can duplicate the HTTP request message. The session ID/cookie handler module 220 can be used to generate a mapping relation between cookie1 from the existing server and cookie2 from the staging server. The session ID/cookie handler module 220 can allow the mapping relation stored in the session ID/cookie mapping database 232.

The HTTP session traffic filter module 224 can determine whether the session traffic is to be passed through the HTTP traffic duplicator module 216. The capability of the staging server 208-S is sometimes not as good as the existing server 208-E. Thus, when the staging server 208-S is not overloaded, the HTTP session traffic filter module 224 can allow the session traffic to pass through the HTTP traffic duplicator module 216.

As mentioned previously, the test case logger module 228 can be used to record the test result in the test case logging database 236 for future use. The test results can be mainly categorized as: (1) SUCCESS (the test cases that are successful at the verification points); (2) FAILED (the cases that [are] failed at the verification points); (3) BYPASS (the test cases that are not duplicated and not sent to the staging server 208-S); and (4) NON-VP (the test cases that do not need verification points).

The staging server load detector module 240 is used to detect whether the staging server 208-S is overloaded. Further, when determining there is no test case ID in the HTTP request messages, and the HTTP request message is the first HTTP request message of the session traffic, the test case ID generator module 230 generates a test case ID for the first HTTP request message.

The session ID/cookie mapping database 232 is used to store a mapping relation between the first session identifier from the existing server 208-E and the second session identifier from the staging server 208-S. In response to the HTTP traffic duplicator module 216 duplicating the HTTP request message, the session ID/cookie handler module 220 will look for the mapping relation between the first session identifier and the second session identifier in the session ID/cookie mapping database 232. Further, in the HTTP request message to the staging server 208-S, the first session identifier is replaced by the second session identifier based on the first session identifier and the mapping relation.

The test case logging database 236 is used to store the test results. When the test results are "SUCCESS" or "FAILED," the test case IDs exist. When the test result is "BYPASS," there is no test case ID.

In view of the above, according to the present invention, the HTTP traffic duplicator module 216 of the intermediary proxy machine 204 can duplicate the HTTP request messages, and the duplicated HTTP request messages can be transmitted to the existing server 208-E and the staging server 208-S, respectively, by the transmitting module. After the intermediary proxy machine 204 receives the HTTP reply messages from the existing server 208-E and the staging server 208-S, the HTTP reply comparator module 244 of the intermediary proxy machine 204 will compare whether they are identical. Regarding the staging server 208-S, the test results of "SUCCESS" or "FAILED" will be recorded in the test case logging database 236. On the other hand, according to embodiments of the present invention, if the staging server 208-S is overloaded, the transmitting module of the intermediary proxy machine 204 will only transmit the HTTP request messages to the existing server 208-E and indicate a test result of "BYPASS" in the test case logging database 236.

The capabilities of the present invention can be implemented in software, firmware, hardware or some combination thereof. As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiments to the invention have been described, it will be understood that those skilled in the art, both now and in the future, may make various improvements and enhancements which fall within the scope of the claims which follow.

What is claimed is:

1. A method of testing a network system comprising an existing server having a first kind of database and a client device transmitting an HTTP request message of session traffic, comprising:
    installing a second kind of database onto a staging server in the network system, said second kind of database providing at least an upgrade to the first kind of database;
    duplicating the HTTP request message from the client device;
    detecting whether the HTTP request message has a first session identifier;
    in response to the HTTP request message having said first session identifier, searching for a mapping relation between said first session identifier and a second session identifier;
    transmitting the HTTP request message to the existing server and said duplicated HTTP request message to said staging server, wherein said first session identifier of the HTTP request message is replaced with said second session identifier, based on said first session identifier and said mapping relation, in said duplicated HTTP request message to said staging server;
    receiving a first HTTP reply message from the existing server and a second HTTP reply message from said staging server;
    comparing said first HTTP reply message from the existing server and said second HTTP reply message from said staging server to determine whether contents of said replies are identical; and
    in response to a determination that said contents of said replies are identical, replacing said first kind of database with said second kind of database.

2. The method of claim 1, further comprising:
    detecting whether said staging server is overloaded;
    in response to said staging server being overloaded, only transmitting the HTTP request message to said existing server without duplicating said HTTP request message; and
    indicating a test result of bypass, after said step of receiving said HTTP reply message.

3. The method of claim 1, further comprising:
    detecting whether the HTTP request message has a test case ID; and
    in response to the HTTP request message having said test case ID, duplicating the HTTP request message to form the duplicated HTTP request messages.

4. The method of claim 3, in response to the HTTP request message not having said test case ID, further comprising:
    detecting whether the HTTP request message is a first HTTP request message of the session traffic; and
    in response to the HTTP request message being said first HTTP request message of the session traffic, generating a test case ID for said first HTTP request message of the session traffic.

5. The method of claim 4, in response to the HTTP request message not being said first HTTP request message of the session traffic, further comprising:
    transmitting the HTTP request message only to the existing server without duplicating the HTTP request message; and
    indicating a test result of bypass, after said step of receiving said HTTP reply messages.

6. The method of claim 1, in response to transmitting the duplicated HTTP request messages to the existing server and the staging server, further comprising:
    detecting whether said first HTTP reply message from the existing server and said second HTTP reply message from the staging server have said first and second session identifier, respectively; and
    in response to said first HTTP reply message from the existing server and said second HTTP reply message from the staging server having said first and second session identifier, respectively, extracting said first session identifier and said second session identifier and indicating said mapping relation of said first session identifier and said second session identifier.

7. The method of claim 6, in response to said first HTTP reply message from the existing server not having said first session identifier, further comprising:
    sending the duplicated HTTP request messages to the existing server and the staging server, respectively;
    receiving said first HTTP reply message from the existing server with said first session identifier and said second HTTP reply message from the staging server with said second session identifier; and
    generating said mapping relation based on said first session identifier and said second session identifier.

8. The method of claim 1, in response to receiving said first HTTP reply message from the existing server and said second HTTP reply message from the staging server, further comprising:

detecting whether a verification point is required, wherein in response to said verification point not being required, indicating a test result of non-vp;

detecting whether an error occurs in said first and second HTTP reply messages, wherein in response to an error occurring, indicating a test result of failed;

detecting whether said first and second HTTP reply messages have said first and second session identifiers, respectively, wherein in response to said first and second HTTP reply messages not having said first and second session identifiers, transmitting said first HTTP reply message from the existing server to the client device; and in response to said verification point being required and said error not occurring in said first and second HTTP reply messages, abstracting said first and second HTTP reply messages and indicating a test result of success.

9. The method of claim 8, wherein:

said first session identifier and said second session identifier are selected from either a session ID or a cookie;

wherein said test results are recorded in a test case record database; and wherein said first session identifier is related to said first HTTP reply message from the exiting server and said second session identifier is related to said second HTTP reply message from the staging server.

10. A computer program product for testing a network system comprising an existing server having a first kind of database and a client device transmitting an HTTP request message of session traffic, the computer program product comprising a computer readable storage medium having computer readable program code embodied therewith, the computer readable program code comprising:

computer readable program code configured to install a second kind of database onto a staging server in the network system, said second kind of database providing at least an upgrade to the first kind of database;

computer readable program code configured to duplicate the HTTP request message from the client device;

computer readable program code configured to detect whether the HTTP request message has a first session identifier;

in response to the HTTP request message having said first session identifier, computer readable program code configured to search for a mapping relation of said first session identifier and a second session identifier;

computer readable program code configured to transmit the HTTP request message to the existing server and said duplicated HTTP request message to said staging server, respectively, wherein said first session identifier of the HTTP request message is replaced with said second session identifier, based on said first session identifier and said mapping relation, in said duplicated HTTP request message to said staging server;

computer readable program code configured to receive a first HTTP reply message from the existing server and a second HTTP reply message from said staging server;

computer readable program code configured to compare said first HTTP reply message from the existing server and said second HTTP reply message from said staging server to determine whether contents of said replies are identical; and in response to a determination that said contents of said replies are identical, computer readable program code configured to replace said first kind of database with said second kind of database.

11. The computer program product of claim 10, further comprising:

computer readable program code configured to detect whether the staging server is overloaded;

in response to the staging server being overloaded, computer readable program code configured to only transmit the HTTP request message to the existing server without duplicating the HTTP request message; and computer readable program code configured to indicate a test result of bypass, after said computer readable program code configured to receive said first and second HTTP reply message.

12. The computer program product of claim 10, further comprising:

computer readable program code configured to detect whether the HTTP request message has a test case ID; and in response to the HTTP request message having said test case ID, computer readable program code configured to duplicate the HTTP request message to form the duplicated HTTP request messages.

13. The computer program product of claim 12, in response to the HTTP request message not having said test case ID, further comprising:

computer readable program code configured to detect whether the HTTP request message is said first HTTP request message of the session traffic; and in response to the HTTP request message being said first HTTP request message of the session traffic, computer readable program code configured to generate a test case ID of said first HTTP request message of said session traffic.

14. The computer program product of claim 13, in response to the HTTP request message not being said first HTTP request message of said session traffic, further comprising:

computer readable program code configured to transmit the HTTP request message only to the existing server without duplication; and computer readable program code configured to indicate a test result of bypass, after said step of receiving the HTTP reply messages.

15. The computer program product of claim 10, in response to transmitting the duplicated HTTP request messages to the existing server and the staging server, respectively, further comprising:

computer readable program code configured to detect whether said first HTTP reply message from the existing server and said second HTTP reply message from the staging server have a first and a second session identifier, respectively; and in response to said first HTTP reply message from the existing server and said second HTTP reply message from the staging server having said first and second session identifier, respectively, computer readable program code configured to extract said first session identifier and said second session identifier; and computer readable program code configured to indicate said mapping relation of said first session identifier and said second session identifier.

16. The computer program product of claim 15, wherein in response to said first HTTP reply message from the existing server not having said first session identifier, further comprising:

computer readable program code configured to send the duplicated HTTP request messages to the existing server and the staging server, respectively;

computer readable program code configured to receive said first HTTP reply message from the existing server with said first session identifier and said second HTTP reply message from the staging server with said second session identifier; and computer readable program code configured to generate said mapping relation based on said first session identifier and said second session identifier.

17. The computer program product of claim 10, wherein in response to receiving said first HTTP reply message from the existing server and said second HTTP reply message from the staging server, further comprising:

computer readable program code configured to detect whether a verification point is required, wherein in response to said verification point being not required, indicating a test result of non-vp;

computer readable program code configured to detect whether an error occurs in said first and second HTTP reply messages, wherein in response to an error occurring, indicating a test result of failed;

computer readable program code configured to detect whether said first and second HTTP reply messages have said session identifiers, respectively, wherein in response to said first and second HTTP reply messages not having said first and second session identifiers, computer readable program code configured to transmit said first HTTP reply message from the existing server to the client device; and in response to said verification point being required and said error not occurring in said first and second HTTP reply messages, computer readable program code configured to abstract said first and second HTTP reply messages and computer readable program code configured to indicate a test result of success.

18. A computer for testing a network system comprising an existing server having a first kind of database and a client device transmitting an HTTP request message of session traffic, comprising:

a processor; and memory connected to the processor, wherein the memory is encoded with instructions and wherein the instructions when executed comprise:

instructions for installing a second kind of database onto a staging server in the network system, said second kind of database providing at least an upgrade to the first kind of database;

instructions for duplicating the HTTP request message from the client device;

instructions for detecting whether the HTTP request message has a first session identifier;

in response to the HTTP request message having said first session identifier, instructions for searching for a mapping relation between said first session identifier and a second session identifier;

instructions for transmitting the HTTP request message to the existing server and said duplicated HTTP request message to said staging server, respectively, wherein said first session identifier of the HTTP request message is replaced with said second session identifier, based on said first session identifier and said mapping relation, in said duplicated HTTP request message to said staging server;

instructions for receiving a first HTTP reply message from the existing server and a second HTTP reply message from said staging server;

instructions for comparing said first HTTP reply message from the existing server and said second HTTP reply message from said staging server to determine whether contents of said replies are identical; and in response to a determination that said contents of said replies are identical, instructions for replacing said first kind of database with said second kind of database.

19. The computer of claim 18, further comprising:

instructions for detecting whether the staging server is overloaded;

in response to the staging server being overloaded, instructions for only transmitting the HTTP request message to the existing server without duplicating the HTTP request message.

20. The computer of claim 18, further comprising:

instructions for detecting whether the HTTP request message has a test case ID; and in response to the HTTP request message having said test case ID, instructions for duplicating the HTTP request message to form the duplicated HTTP request messages.

21. The computer of claim 18, wherein in response to transmitting the duplicated HTTP request messages to the existing server and the staging server, respectively:

instructions for detecting whether said first HTTP reply message from the existing server and said second HTTP reply message from the staging server have a first and second session identifier, respectively; and in response to said first HTTP reply message from the existing server and said second HTTP reply message from the staging server having said first and second session identifier, respectively, instructions for extracting said first session identifier and said second session identifier and instructions for indicating said mapping relation of said first session identifier and said second session identifier.

22. The computer of claim 21, wherein in response to said first HTTP reply message from the existing server not having said first session identifier, instructions for sending the duplicated HTTP request messages to the existing server and the staging server, respectively;

instructions for receiving said first HTTP reply message from the existing server with said first session identifier and said second HTTP reply message from the staging server with said second session identifier; and instructions for generating said mapping relation based on said first session identifier and said second session identifier.

* * * * *